Jan. 12, 1965  P. FOMBONNE  3,165,744
SYSTEMS FOR DETERMINING THE ELEVATION OR AZIMUTH OF A BODY
Filed Jan. 15, 1963  3 Sheets-Sheet 1
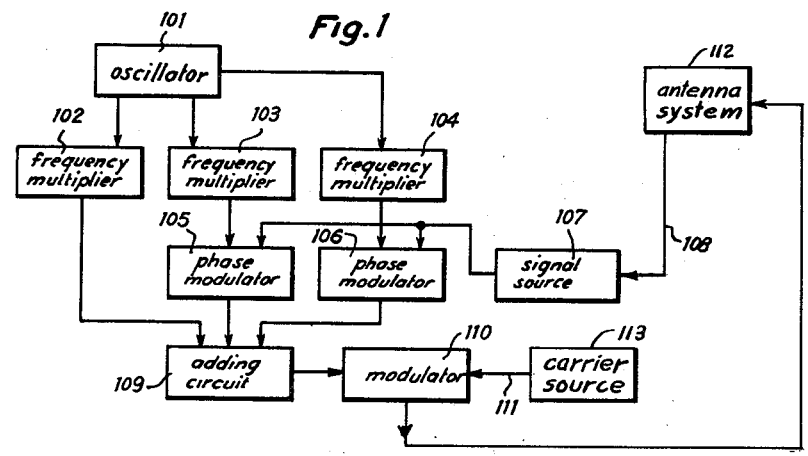
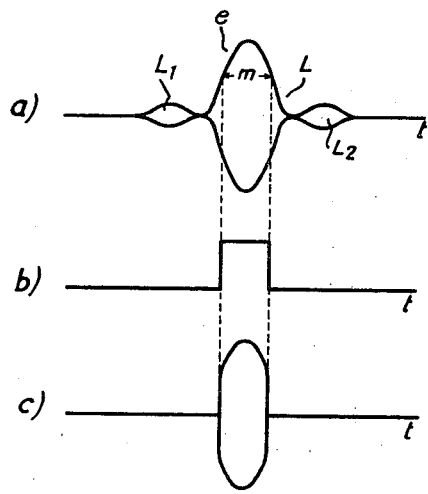

3,165,744
SYSTEMS FOR DETERMINING THE ELEVATION
OR AZIMUTH OF A BODY
Paul Fombonne, Paris, France, assignor to C.S.F.-Compagnie Générale de Télégraphie Sans Fil, a corporation of France
Filed Jan. 15, 1963, Ser. No. 251,651
Claims priority, application France, Jan. 16, 1962,
884,921
6 Claims. (Cl. 343—106)

The present invention relates to systems for allowing a moving body to determine its elevation or azimuth relative to a frame of reference, by means of a moving beam radiating a carrier wave which is modulated as a function of the instantaneous position of the beam.

A system of this type is known, wherein the carrier wave is modulated by a low frequency signal, which is itself frequency modulated as a function of the position of the beam, the frequency modulation making the information available independently of the power with which the carrier is received. However, the frequency modulation of the low frequency signal may lead in some cases to a somewhat large frequency swing. The receiving circuits are then rather critical and a large modulation frequency band is required for the transmission of a single angular information.

It is an object of the invention to provide a system which is immune of this drawback.

In the system according to the invention the carrier wave, which is used for producing the moving beam, is modulated by at least two subcarriers whose frequencies are obtained by multiplying the same basic frequency by different factors. One of these subcarriers is not modulated and is used as a reference. The other subcarrier or subcarriers are phase modulated as a function of the instantaneous elevation, or azimuth, angle which defines the instantaneous position of the beam. At the reception point, the various subcarriers are separated: the modulated subcarriers are compared in phase with the reference subcarrier after suitable frequency multiplications, which bring their respective frequencies to the same value. These comparisons provide the angular coordinate of the receiver with an increasing degree of precision, if more than one modulated subcarrier is used.

As to the beam used, it is sufficient, where a measure of elevation is concerned, that it should be, in any azimuth plane of the azimuth range considered, substantially symmetrical with respect to the axis of maximum radiation in this plane, and that all these axes of maximum radiation should have, at any instant substantially the same elevation.

Two main antenna types may be used, according to the nature of the surface comprising the axes of maximum radiation in the various azimuth planes considered, which surface is called herein "axial surface of the beam."

This surface may be that of a cone having a vertical axis and may, in azimuth, illuminate either the entire horizon, or be confined between two vertical planes passing through the axis of the cone; in this case, during the scanning in elevation, the angle at the vertex of the cone varies but, whatever this angle, all the axes of maximum radiation present at each instant are at the same elevation, which is the elevation of the beam.

The axial surface may also be a plane and its useful portion is then limited by two vertical planes passing through the origin of the beam, so that the respective elevation angles of the maximum radiation directions in the different azimuth planes may be considered as substantially equal to the angle between the axial plane and the horizontal plane, this angle defining the elevation of the beam.

For a measurement of the azimuth, it will suffice that, throughout the whole of the elevation range considered, the beam should be in any elevation plane substantially symmetrical with respect to the axis of maximum radiation, these axes presenting approximately the same instantaneous azimuth.

Generally a plane axial surface will be used here, i.e., a beam which is symmetrical with respect to a vertical plane, which plane rotates about a vertical axis passing through the origin of the beam, to scan a given azimuth range. In this case, all the axes of maximum radiation have the same instantaneous azimuth, which is the azimuth of the beam.

The signal received by the moving body, for example an aircraft, provides the latter with the information as to the elevation (or azimuth) of the beam, at the instant when the aircraft is swept by the axis of maximum radiation of the beam in the azimuth (or elevation) plane where the aircraft is located.

The invention will be best understood from the following description and appended drawings, wherein:

FIG. 1 is a block diagram of the modulation circuits of a transmitter according to the invention;

FIG. 3 shows graphs illustrating the operation of the receiver of FIG. 2; and

Figure 2:
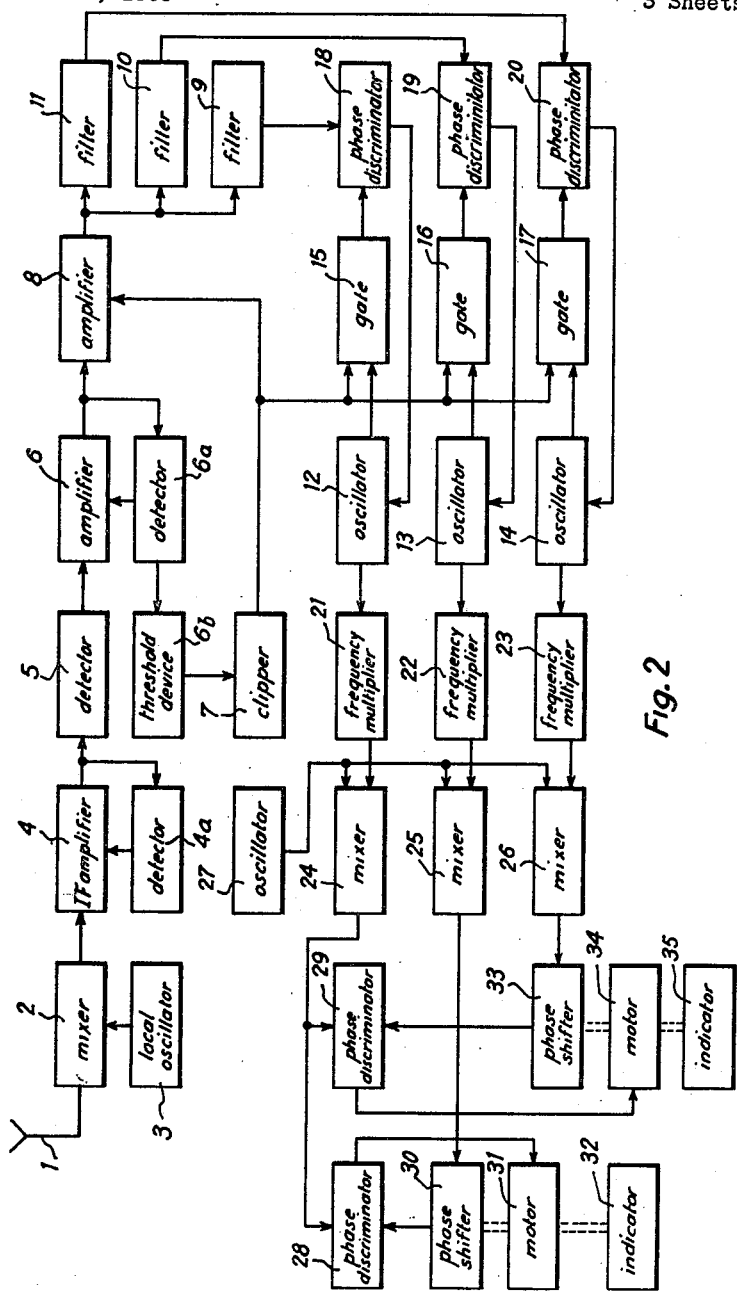
FIG. 2 is a block diagram of a receiver according to the invention, adapted to be used when the carrier is amplitude modulated by the subcarriers.

The invention will be set forth with reference to a particular situation, taken as an example, wherein it is used for continuously informing an aircraft about its elevation with the view to making possible or easier its landing. The numeric values are, of course, given only by way of example.

In this case, a transmitter located at the entrance of the landing lane radiates a lobe, having a plane of symmetry as defined above. In each azimuthal plane of the used portion of the lobe, its aperture in elevation is approximately $\pm 1°$ at 3 db below the maximum on both sides of the axis of maximum radiation in the azimuthal plane considered.

It will be assumed that the total aperture of the lobe in elevation, for all the azimuthal directions of the area covered, is $\pm 2°$.

This lobe scans the space in elevation within a volume defined by two planes respectively inclined at $2°$ and $45°$ to the horizontal plane comprising the point where the transmitter is located and with respect to which the elevation is to be determined. The scanning is effected without rotation in azimuth, and, consequently, the space covered is defined in the horizontal plane by the useful width of the beam in azimuth, which is, for example, of $\pm 10°$ on both sides of the central azimuth plane.

The beam effects the scanning in elevation angle S as a function of time $t$ according to a saw-tooth, sinusoidal or other $S(t)$ pattern. The transmission may take place while the elevation angle S increases or decreases or during both operations.

It is merely assumed that the reception point is swept a sufficient number of times per second, say 5, for example, at a roughly uniform rate.

The carrier of the beam may have a frequency of 4,000 mc./s. and is modulated by three subcarriers, at 60, 80 and 90 mc./s. The first of these subcarriers is not modulated. The other two are modulated in phase as a function of the instantaneous elevation angle $S(t)$ of the beam.

FIG. 1 illustrates the modulation circuit of the transmitter.

The circuit comprises an oscillator 101. Its frequency is, for example, of 10 kc./s. and is stabilized, for example by means of a quartz. It provides a wave of a phase $\omega t$ and feeds multipliers 102, 103 and 104, which multiply their input frequency respectively by 6, 8 and 9. The respective phases of the output signals of multipliers 102, 103 and 104 are thus $6\omega t$, $8\omega t$ and $9\omega t$.

The outputs of multipliers 103 and 104 feed respectively two phase-modulators 105 and 106 wherein they are modulated by signal $S(t)$ which is delivered by a device 107, the latter being mechanically or electromechanically connected to an antenna system 112 which comprises both the moving transmitting aerial by means of which the space is scanned with a moving beam and the means for moving said aerial by means of a connection 108 and controlled by the motion thereof. Modulator 105 is adjusted in such a manner that the subcarrier at 80 kc./s. is phase modulated according to the law $$p = \frac{2\pi}{9} \cdot \frac{S}{45}$$

with phase $p$ is expressed in radians and angle S in degrees. Modulator 106 is so adjusted that the subcarrier at 90 kc./s. is modulated according to the law $$p' = \frac{20\pi}{8} \cdot \frac{S}{45}$$

wherein phase $p'$ is also expressed in radians and angle S in degrees. The phase of the signals at the output of modulators 105 and 106 is respectively $8\omega t + p$ and $9\omega t + p'$.

The circuits are preferably so adjusted that these two modulated oscillations and the nonmodulated wave delivered by multiplier 102, have the same amplitude.

The three oscillations are linearly added in a circuit 109 in a manner well known in the art.

The output signal of circuit 109 is connected to the modulation input of an amplitude modulator 110 wherein it modulates a carrier at 4000 mc./s., which is supplied through a carrier source 113 and is applied to the input 111 of the modulator. Modulator 110 provides the modulated carrier which is used for the transmission of the beam as indicated by the line connecting modulator 110 to antenna system 112.

FIG. 2 is a block diagram of an embodiment of the receiver located aboard the aircraft. An antenna 1 feeds a mixer 2, which is also fed by a local oscillator 3. Mixer 2 is followed by an intermediate frequency amplifier 4. The output of amplifier 4 is applied to a first detector 4a, to provide an automatic gain control of amplifier 4, and to a further detector 5. Detector 5 is followed by a low-frequency amplifier 6, the output of which feeds in parallel a further low-frequency amplifier 8, which is normally blocked, and a detector 6a. The latter is connected to provide an automatic gain control of amplifier 6.

Detector 6a is also connected to a threshold device 6b, which is followed by a circuit 7, comprising an amplifier and a clipper, the output of which is connected to an electrode of the normally blocked amplifier 8, in order to control the unblocking thereof.

The signal, which is picked up by antenna 1, is frequency translated to intermediate frequency in mixer 2, effected by means of amplifier 4.

The time constant of the automatic gain control of amplifier 4 is selected such that the envelope $e$ of the low-frequency signal, which is derived from detector 5, presents a generally constant maximum level and follows the variations of the receiver input level which depend on the relative position of the receiver and of the scanning beam, while the aircraft is swept by the beam, i.e., depends on the shape of the radiation pattern of the beam in the azimuthal plane of the aircraft.

The output signal of detector 5 is amplified by amplifier 6 whose automatic gain control improves that which is effected by means of amplifier 4.

The envelope $e$ of the low-frequency signal is shown in FIG. 3a. As already mentioned, its shape depends on that of the radiating pattern of the transmission antenna in the azimuthal plane.

By way of example, it has been assumed, in FIG. 3a, that the antenna, in addition to the main lobe, which is as indicated above, and to which corresponds the portion L of the envelope, also radiates two secondary lobes respectively generating portions L1 and L2 of the envelope.

From this low-frequency signal, only that portion is preserved which is not lower than 3 db below the maximum of the signal received by the aircraft while it is swept by the beam, thus eliminating the secondary lobes, and the side portions of the main lobe.

To this end, the low-frequency signal at the output of amplifier 6 is rectified in detector 6a, thus providing a signal which corresponds to the upper half of the envelope $e$ shown in FIG. 3a.

The threshold device 6b is adjusted to pass only the peak portion of the output signal of detector 6a. The corresponding signal is amplified and clipped by clipper 7 to provide the square signal shown in FIG. 3b, which is applied to amplifier 8 so as to unblock it during its duration.

The low-frequency signal, the envelope of which is shown in FIG. 3c, is thus obtained at the output of amplifier 8. The latter feeds narrow-band filters 9, 10 and 11, which are respectively centered on frequencies 60, 80 and 90 kc./s., thus filtering the nonmodulated subcarrier and the two modulated subcarriers.

The receiver also comprises oscillators 12, 13 and 14. They are respectively tuned to 60, 80 and 90 kc./s. and feed respectively gates 15, 16 and 17, the respective gating inputs of which are connected to the output of clipper 7; gates 15, 16 and 17 are switched on to pass the output signals of oscillators 12, 13, 14 only during the application of the signal shown in FIG. 3b.

Thus, each time the target is swept by the beam, trains of oscillations at 60 kc./s. of the same duration and of an amplitude which is substantially constant in each train are made available at the outputs of gate 15 and of filter 9. The levels are so adjusted that the output signal of oscillator 12 is substantially higher than that of the output signal of filter 9.

The same holds true in so far as the oscillation trains at 80 kc./s., which are collected at the outputs of gate 16 and filter 10, and the oscillation trains at 90 kc./s. which are collected at the outputs of gate 17 and filter 11, are concerned.

The carrier wave picked up by antenna 1 at an instant $t$ may be considered as modulated by the subcarriers, with the respective phases:

$$6\omega(t-t_0), \ 8\omega(t-t_0)+p, \text{ and } 9\omega(t-t_0)+p'$$

where $t_0$ designates time of propagation between the transmitter and the receiver.

Provided the receiver circuits between antenna 1 and the output of amplifier 8 do not introduce any phase distortion and that filters 9, 10 and 11 impart the same delay to the signals which they respectively translate, correcting phase-shifters being, if necessary, inserted into two of them, three oscillations are made available at the outputs of these filters, whose respective phases are of the form:

$$6\omega(t-t_1), \ 8\omega(t-t_1)+p \text{ and } 9\omega(t-t_1)+p'$$

or changing the origin of the times for simplifying the notation, $$6\omega t', \ 8\omega t'+p \text{ and } 9\omega t'+p'$$

where $t' = t - t_1$.

The outputs of gate 15 and filter 9 are respectively connected to the two inputs of a phase discriminator 18.

The latter is provided at its output, with a low-pass filter and delivers, after phase-shifting by $\pi/2$ of one of its input signals, an error signal proportional to the sine of their phase difference. This signal, after passing through the above mentioned low-pass filter, is used in a known manner to control the phase of oscillator 12 by the output signal of filter 9.

The phases of oscillators 13 and 14 are in the same manner respectively tied to the phases of the output signals of filters 10 and 11 by means of circuits respectively including phase discriminators 19 and 20 which are identical to discriminator 18.

Thus, oscillators 12, 13 and 14 reproduce the respective phases of the output signals of filters 9, 10 and 11 and keep them until the aircraft is again swept by the beam.

Oscillators 12, 13 and 14 also feed respectively frequency multipliers 21, 22 and 23 which multiply the frequency respectively by 12, 9, 8. Three oscillations are thus collected having a common angular frequency $72\omega$, i.e., a frequency of 720 kc./s. and the respective phases of which are $72\omega t'$, $72\omega t' + 9p$ and $72\omega t' + 8p'$.

The phase-shift of the second of these oscillations with respect to the first is thus $9p$, and that of the third with respect to the first, $8p'$.

In order to make the measurement of $p$ and $p'$ more convenient, these three oscillations have their respective frequencies lowered to 10 kc./s. by means of three mixers 24, 25 and 26, which receive from an oscillator 27 an oscillation at 710 kc./s., this operation not modifying the phase shifts $9p$ and $8p'$ mentioned above.

Mixers 24, 25 and 26 deliver thus three oscillations at 10 kc./s. which will be designated by I, II, III, the circuits being so that they have substantially the same amplitude. Oscillation II is phase-shifted by $9p = 2\pi.S/45$, and oscillation III by $8p' = 20\pi S/45$, with respect to oscillation I. Oscillation II is phase-shifted in a phase-shifter 30, of the goniometric type, which has a shaft in common with a motor 31. The imparted phase-shift, $-b$ in radians, is equal to the angle defining the position of the rotor of the phase-shifter with respect to an initial position; the output signal of phase-shifter 30 is thus phase-shifted by $+9p-b$ relative to oscillation I.

The output of phase-shifter 30 is then compared in phase with oscillation I in a phase discriminator 28, which delivers, upon shifting by $\pi/2$ of one of its input signals, a signal proportional to the sine of half of the phase-shift angle between these input signals. This output signal is applied to a winding of motor 31, so as to cancel $9p-b$, i.e., to make $$b = 9p = 2\pi S/45$$

The rotor of phase-shifter 30 thus effects a complete turn, while value S detected varies from 0 to 45°.

The shaft of motor 31 also drives the rotor of an indicator 32, providing an indication, which is coarse but unambiguous, of elevation S.

The information $8p'$ is detected in the same manner: oscillation III is phase shifted by an angle $-c$ in a goniometric phase-shifter 33, whose rotor is carried by the shaft of motor 34. The output oscillation of phase-shifter 33 is compared in phase with oscillation I in a phase discriminator 29. The output signal of the latter is applied to a winding of motor 34, so as to cancel $8p'-c$, i.e., to make $c = 8p' = 20\pi.S/45$.

The shaft of motor 34 drives the pointer of another indicator 35, which effects ten turns when the detected signal S varies from 0 to 45°. Indicator 35 thus provides a finer measurement of the non-ambiguous value delivered by the first indicator.

In the example described, the carrier was amplitude modulated by the subcarriers. This is in no way a necessary condition and the carrier may be, for example, frequency modulated by the output signal of circuit 109.

Figure 4:
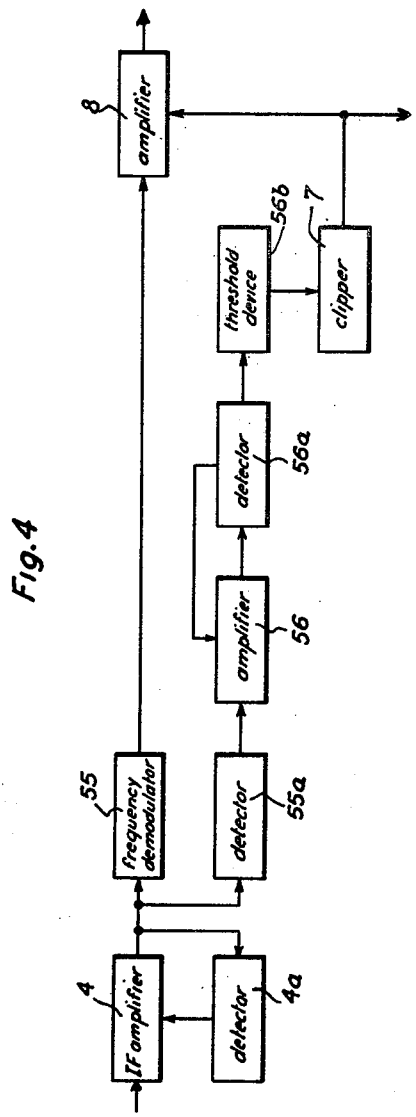
FIG. 4 illustrates the modification to be brought to the receiver of FIG. 2, if the carrier is to be frequency modulated.

Certain modifications are then to be brought to the receiver of FIG. 2 in order to obtain at the output of filters 9, 10 and 11 trains of signals similar to those obtained when there is amplitude modulation; these modifications will be described with reference to FIG. 4, where only those circuit portions which are modified are shown.

Nothing is modified up to the output of the intermediate-frequency amplifier 4. However, the latter now feeds in addition to detector 4a, a frequency demodulator 55, including a frequency discriminator preceded by an amplitude limiter, and another detector 55a. The output of demodulator 55 is connected to the low-frequency amplifier 8, whereas detector 55a feeds another low-frequency amplifier 56, followed by detector 56a. The output signal of detector 55a is applied to amplifier 56, to provide a gain control, and to a threshold device 56b, the output of which is connected to the amplifying and clipping circuit 7. It is seen that the circuit arrangement 55a, 56, 56a, 56b, 7 is identical to the circuit 5, 6, 6a, 6b, 7 of FIG. 2. It operates in the same way, the time constant of the gain control of amplifier 4 being such that the envelope of the output signal of detector 55a may reproduce the level variations which, at the receiver input, depend on the relative position of the receiver and of the beam while the latter sweeps the aircraft and presents the shape shown in FIG. 3a; the circuit which is fed by detector 55a is used to deliver, as indicated above, the square signal shown in FIG. 3b.

This signal is applied to amplifier 8 and gates 15, 16 and 17. The operation of the receiver is, for the remainder, identical to that of the receiver illustrated in FIG. 2. However, it may be noted that the output signal of amplifier 8 has a duration corresponding to that of the signal of FIG. 3c, but that the shape of its envelope is not the same as above, since amplifier 8 is fed by the frequency demodulator 5 which comprises an amplitude limiter, but, as before, the oscillation trains obtained at the output of filters 9, 10 and 11 have a substantially constant amplitude.

With the modulation process described here, a narrow band will suffice for each subcarrier to transmit the information. Since the scanning is effected at a very low frequency (a few c./s.), the frequency swing associated with the phase modulation does not exceed a few tens of c./s. and the bands are very narrow.

Other informations may easily be transmitted on the same carrier, by means of other subcarriers. The only condition to be satisfied is that the cross-talk level between the various subcarriers should be low so that the phases of angular information subcarriers are not perturbed beyond allowable limits.

In a general way, the $n$ subcarriers are obtained by multiplication by $A_0, A_1 \ldots A(n-1)$ of the same basic frequency, one subcarrier remaining unmodulated and the others being phase modulated.

The receiver comprises then $n$ oscillations controlled in phase by the subcarriers by means of respective gating systems such as described and the phase informations are detected after the modulated wave and the nonmodulated waves have been translated to the same frequency.

Of course, the invention is not limited to the embodiments described and illustrated, which were given solely by way of example.

In particular, the phase modulation as a function of the elevation is not necessarily linear. For example, a logarithmic law may be used. The graduation of the indicators follows, of course, the same law.

The elevation and azimuth indications delivered by the position of the goniometric phase-shifters may of course be used for purposes other than merely feeding indicators.

What is claimed is:

1. A system for allowing a moving body to determine an angular co-ordinate of said body with respect to a frame of reference, said system comprising:

a transmitting station, located at the origin of said frame of reference and comprising: means for scanning a space portion according to said angular coordinate with a beam which is generated by means of a carrier wave; and means for modulating said carrier wave with $n$ subcarrier waves, where $n$ is an integer greater than one, said $n$ subcarrier waves having respective frequencies which are different multiples of a basic frequency, one of said $n$ subcarrier waves remaining unmodulated to serve as a phase reference, and the other $(n-1)$ of said $n$ subcarrier waves being phase modulated according to different functions of an angle value defining the instantaneous direction of said beam according to said angular coordinate;

and a receiver, located aboard said body and comprising: means for receiving said modulated carrier wave while it is swept by said beam; means for demodulating said carrier wave to obtain $n$ subcarrier waves; means for deriving from said $n$ intermittently received subcarrier waves $n$ continuous waves respectively associated with said $n$ subcarrier waves, said $n$ continuous waves having a common frequency and respective phases depending upon that of the associated subcarrier wave; and means for measuring the phase shifts between that one of said continuous waves which is associated with said one subcarrier wave, and each of the $(n-1)$ others of said $n$ continuous waves.

2. A receiver comprising: means for intermittently receiving a carrier wave which is modulated by $n$ subcarrier waves, where $n$ is an integer greater than one, said $n$ subcarrier waves having respective frequencies which are different multiples of a basic frequency; means for demodulating said carrier wave to obtain said $n$ subcarrier waves; means, including frequency multiplying means, for deriving from said $n$ subcarrier waves $n$ continuous waves, respectively associated with said $n$ subcarrier waves, said $n$ continuous waves having a common frequency and respective phases depending upon that of the last obtained associated subcarrier wave; and means for measuring the phase shift between a predetermined one of said continuous waves and each of the $(n-1)$ others of said continuous waves.

3. A receiver for receiving during recurrent time intervals a carrier wave which is radiated under the form of a moving beam, after having been modulated by a signal constituted by the sum of $n$ subcarrier waves, said subcarrier waves having respective frequencies which are different multiples of a basic frequency, said receiver comprising:

means for receiving said carrier wave;
means for demodulating said carrier wave to obtain said signal;
automatic gain control means for maintaining substantially constant the maximum level of the envelope of said signal during each of said time intervals;
means for deriving from said envelope of said signal a gating pulse corresponding to the center portion of said envelope;
gating means controlled by said gating pulse for limiting said signal to its center portion;
$n$ filters, fed with said center portion of said signal, for separating said subcarrier waves;
$n$ oscillators respectively associated with said $n$ filters for delivering $n$ continuous waves, each of said oscillators having a frequency equal to that of the subcarrier delivered by said associated filter;
means for locking the phase of each of said oscillators to that of the subcarrier delivered by said associated filter;
frequency multiplying means for deriving from said $n$ continuous waves respectively $n$ other continuous waves having a common frequency;

$n$ frequency changers having respective outputs for deriving from said second continuous waves respectively $n$ third continuous waves having a second common lower frequency, said $n$ frequency changers comprising a first frequency changer delivering a continous wave corresponding to a predetermined one of said subcarrier waves and $(n-1)$ other frequency changers;

$(n-1)$ servo systems respectively associated with said $(n-1)$ other frequency changers, each said servo systems having an output shaft and controlling the angular position of said shaft as a function of the phase shift between the output signals of said associated frequency changer and of said first frequency changer, and comprising: a phase shifter of the goniometric type having a rotor mounted on said shaft, an input connected to the output of said associated frequency changer and an output; a phase discriminator having two inputs respectively coupled to the output of said phase shifter and to the output of said first frequency changer; and a motor mounted on said shaft and controlled by the output signal of said phase discriminator.

4. A receiver as claimed in claim 3, wherein said carrier wave being amplitude modulated by said signal, said demodulating means is a detector.

5. A receiver as claimed in claim 3, wherein said carrier wave being frequency modulated by said signal, said demodulating means is a frequency demodulator, said automatic gain control means including an amplitude detector.

6. A receiver for receiving during recurrent time intervals a carrier wave which is radiated under the form of a moving beam, after having been modulated by a signal constituted by the sum of $n$ subcarrier waves, said subcarrier waves having respective frequencies which are different multiples of a basic frequency, said receiver comprising:

means for receiving said carrier wave;
means for demodulating said carrier wave to obtain said signal;
means including automatic gain control means for limiting said signal to its center portion;
$n$ filters for separating said subcarrier waves;
$n$ oscillators respectively associated with said $n$ filters for delivering $n$ continuous waves, each of said oscillators having a frequency equal to that of the subcarrier delivered by said associated filter;
means for locking the phase of each of said oscillators to that of the subcarrier delivered by said associated filter;
means for deriving from said $n$ continuous waves respectively $n$ other continuous waves having a common frequency;
and means for measuring the phase shifts between a predetermined one of said last mentioned continuous waves and each of the $(n-1)$ others of said last mentioned continuous waves.

References Cited by the Examiner
UNITED STATES PATENTS

| | | | |
|---|---|---|---|
| 2,252,699 | 8/41 | Byrne | 343—106 |
| 2,562,682 | 7/51 | Schmitt | 343—106 |
| 2,572,041 | 10/51 | Litchford et al. | 343—106 |

OTHER REFERENCES

Technical Report on Radux; Cruft Laboratory, Harvard University; July 11, 1947.

CHESTER L. JUSTUS, *Primary Examiner.*
KATHLEEN H. CLAFFY, *Examiner.*